(12) United States Patent
Schmid

(10) Patent No.: US 10,792,566 B1
(45) Date of Patent: Oct. 6, 2020

(54) SYSTEM FOR STREAMING CONTENT WITHIN A GAME APPLICATION ENVIRONMENT

(71) Applicant: Electronic Arts Inc., Redwood City, CA (US)

(72) Inventor: Jan Andrik Oliver Schmid, Jarfalla (SE)

(73) Assignee: ELECTRONIC ARTS INC., Redwood City, CA (US)

( * ) Notice: Subject to any disclaimer, the term of this patent is extended or adjusted under 35 U.S.C. 154(b) by 433 days.

(21) Appl. No.: 14/871,733

(22) Filed: Sep. 30, 2015

(51) Int. Cl.
*A63F 13/355* (2014.01)
*H04N 19/127* (2014.01)
*H04N 19/179* (2014.01)
*H04N 19/172* (2014.01)
*H04N 19/44* (2014.01)

(52) U.S. Cl.
CPC ......... *A63F 13/355* (2014.09); *H04N 19/127* (2014.11); *H04N 19/172* (2014.11); *H04N 19/179* (2014.11); *H04N 19/44* (2014.11)

(58) Field of Classification Search
CPC .. A63F 13/355; H04N 19/172; H04N 19/179; H04N 19/127; H04N 19/44
See application file for complete search history.

(56) References Cited

U.S. PATENT DOCUMENTS 5,274,801 A 12/1993 Gordon
5,548,798 A 8/1996 King
(Continued)

FOREIGN PATENT DOCUMENTS

CN 102509272 A 6/2012
CN 103546736 A 1/2014
(Continued)

OTHER PUBLICATIONS

Anagnostopoulos et al., "Intelligent modification for the daltonization process", International Conference on Computer Vision Published in 2007 by Applied Computer Science Group of digitized paintings.
(Continued)

*Primary Examiner* — Kang Hu
*Assistant Examiner* — Thomas H Henry
(74) *Attorney, Agent, or Firm* — Knobbe, Martens, Olson & Bear, LLP

(57) ABSTRACT

Embodiments of the present disclosure comprise a content streaming system 120 that can stream content assets within the game environment. The content streaming system 120 can include a decoding module 124 that can decode content prior to streaming. The content streaming system 120 can stream the content asset to the environmental element during runtime without dynamically rendering the content asset during runtime, the decoded content asset can be applied as a textures on elements within the game environment. A content management module 122 can prioritize the order in which the content asset content is decoded and manage the process of streaming the content asset to the environmental elements during runtime. The content management module 122 can also dynamically select the content asset with an appropriate resolution to stream to the environmental element based on runtime gameplay information.

16 Claims, 7 Drawing Sheets

(56) References Cited

U.S. PATENT DOCUMENTS

| | | | |
|---|---|---|---|
| 5,982,389 A | 11/1999 | Guenter et al. | |
| 5,999,195 A | 12/1999 | Santangeli | |
| 6,064,808 A | 5/2000 | Kapur et al. | |
| 6,088,040 A | 7/2000 | Oda et al. | |
| 6,253,193 B1 | 6/2001 | Ginter et al. | |
| 6,556,196 B1 | 4/2003 | Blanz et al. | |
| 6,961,060 B1 | 11/2005 | Mochizuki et al. | |
| 7,006,090 B2* | 2/2006 | Mittring | G06T 15/506 345/426 |
| 7,403,202 B1 | 7/2008 | Nash | |
| 7,415,152 B2 | 8/2008 | Jiang et al. | |
| 8,100,770 B2 | 1/2012 | Yamazaki et al. | |
| 8,142,282 B2 | 3/2012 | Canessa et al. | |
| 8,154,544 B1 | 4/2012 | Cameron et al. | |
| 8,207,971 B1 | 6/2012 | Koperwas et al. | |
| 8,267,764 B1 | 9/2012 | Aoki et al. | |
| 8,281,281 B1 | 10/2012 | Smyrl et al. | |
| 8,395,626 B2 | 3/2013 | Millman | |
| 8,398,476 B1 | 3/2013 | Sidhu et al. | |
| 8,540,560 B2 | 9/2013 | Crowley et al. | |
| 8,599,206 B2 | 12/2013 | Hodgins et al. | |
| 8,624,904 B1 | 1/2014 | Koperwas et al. | |
| 8,860,732 B2 | 10/2014 | Popovic et al. | |
| 8,914,251 B2 | 12/2014 | Ohta | |
| 9,117,134 B1 | 8/2015 | Geiss et al. | |
| 9,256,973 B2 | 2/2016 | Koperwas et al. | |
| 9,317,954 B2 | 4/2016 | Li et al. | |
| 9,483,860 B2 | 11/2016 | Hwang et al. | |
| 9,616,329 B2 | 4/2017 | Szufnara et al. | |
| 9,741,146 B1 | 8/2017 | Nishimura | |
| 9,811,716 B2 | 11/2017 | Kim et al. | |
| 9,826,898 B1 | 11/2017 | Jin et al. | |
| 9,984,658 B2 | 5/2018 | Bonnier et al. | |
| 9,990,754 B1 | 6/2018 | Waterson et al. | |
| 10,022,628 B1 | 7/2018 | Matsumiya et al. | |
| 10,096,133 B1 | 10/2018 | Andreev | |
| 10,118,097 B2 | 11/2018 | Stevens | |
| 10,198,845 B1 | 2/2019 | Bhat et al. | |
| 10,388,053 B1 | 8/2019 | Carter, Jr. et al. | |
| 10,403,018 B1 | 9/2019 | Worsham | |
| 10,535,174 B1 | 1/2020 | Rigiroli et al. | |
| 2002/0180739 A1 | 12/2002 | Reynolds et al. | |
| 2004/0227760 A1 | 11/2004 | Anderson et al. | |
| 2004/0227761 A1 | 11/2004 | Anderson et al. | |
| 2005/0237550 A1 | 10/2005 | Hu | |
| 2006/0036514 A1* | 2/2006 | Steelberg | G01S 5/02 705/28 |
| 2006/0149516 A1 | 7/2006 | Bond et al. | |
| 2006/0262114 A1 | 11/2006 | Leprevost | |
| 2007/0085851 A1 | 4/2007 | Muller et al. | |
| 2007/0097125 A1 | 5/2007 | Xie et al. | |
| 2008/0049015 A1 | 2/2008 | Elmieh et al. | |
| 2008/0152218 A1 | 6/2008 | Okada | |
| 2008/0268961 A1 | 10/2008 | Brook | |
| 2008/0316202 A1 | 12/2008 | Zhou et al. | |
| 2009/0066700 A1 | 3/2009 | Harding et al. | |
| 2009/0315839 A1 | 12/2009 | Wilson et al. | |
| 2010/0134501 A1 | 6/2010 | Lowe et al. | |
| 2010/0251185 A1 | 9/2010 | Pattenden | |
| 2011/0012903 A1 | 1/2011 | Girard | |
| 2011/0086702 A1 | 4/2011 | Borst et al. | |
| 2011/0119332 A1 | 5/2011 | Marshall et al. | |
| 2011/0128292 A1 | 6/2011 | Ghyme et al. | |
| 2011/0164831 A1 | 7/2011 | Van Reeth et al. | |
| 2011/0269540 A1* | 11/2011 | Gillo | A63F 13/005 463/31 |
| 2011/0292055 A1 | 12/2011 | Hodgins et al. | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0244941 A1 | 9/2012 | Ostergren et al. | |
| 2012/0303343 A1 | 11/2012 | Sugiyama et al. | |
| 2012/0313931 A1 | 12/2012 | Matsuike et al. | |
| 2013/0063555 A1 | 3/2013 | Matsumoto et al. | |
| 2013/0120439 A1 | 5/2013 | Harris et al. | |
| 2013/0121618 A1 | 5/2013 | Yadav | |
| 2013/0222433 A1 | 8/2013 | Chapman et al. | |
| 2013/0235045 A1 | 9/2013 | Corazza et al. | |
| 2013/0263027 A1 | 10/2013 | Petschnigg et al. | |
| 2014/0002463 A1 | 1/2014 | Kautzman et al. | |
| 2014/0198106 A1 | 7/2014 | Sumner et al. | |
| 2014/0198107 A1 | 7/2014 | Thomaszewski et al. | |
| 2015/0113370 A1 | 4/2015 | Flider | |
| 2015/0126277 A1* | 5/2015 | Aoyagi | A63F 13/52 463/31 |
| 2015/0187113 A1 | 7/2015 | Rubin et al. | |
| 2015/0235351 A1 | 8/2015 | Mirbach et al. | |
| 2015/0243326 A1 | 8/2015 | Pacurariu et al. | |
| 2015/0381925 A1 | 12/2015 | Varanasi et al. | |
| 2016/0026926 A1 | 1/2016 | Yeung et al. | |
| 2016/0071470 A1 | 3/2016 | Kim et al. | |
| 2016/0217723 A1 | 7/2016 | Kim et al. | |
| 2016/0307369 A1 | 10/2016 | Freedman et al. | |
| 2016/0314617 A1 | 10/2016 | Forster et al. | |
| 2016/0354693 A1 | 12/2016 | Yan et al. | |
| 2017/0301310 A1 | 10/2017 | Bonnier et al. | |
| 2017/0301316 A1 | 10/2017 | Farell | |
| 2018/0043257 A1 | 2/2018 | Stevens | |
| 2018/0122125 A1 | 5/2018 | Brewster | |
| 2018/0211102 A1 | 7/2018 | Alsmadi | |
| 2019/0139264 A1 | 5/2019 | Andreev | |

FOREIGN PATENT DOCUMENTS

| | | |
|---|---|---|
| CN | 105405380 A | 3/2016 |
| CN | 105825778 A | 8/2016 |

OTHER PUBLICATIONS

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999(pp. 187-194). ACM Press/Addison-Wesley Publishing Co.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Dudash, Bryan. "Skinned instancing." NVidia white paper(2007).

Fikkan, Eirik. Incremental loading of terrain textures. MS thesis. Institutt for datateknikk og informasjonsvitenskap, 2013.

Geijtenbeek, T. et al., "Interactive Character Animation using Simulated Physics", Games and Virtual Worlds, Utrecht University, The Netherlands, The Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

(56) References Cited

OTHER PUBLICATIONS

Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez, Benjamin, et al. "Simulating and visualizing real-time crowds on GPU clusters." Computación y Sistemas 18.4 (2014): 651-664.

Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in Computer Games", Eurographics/ACM SIGGRAPH Symposium on Computer Animation (2012), 6 pgs.

Klein, Joseph. Rendering Textures Up Close in a 3D Environment Using Adaptive Micro-Texturing. Diss. Mills College, 2012.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs, obtained Mar. 20, 2015.

Levine, S. et al., "Continuous Character Control with Low-Dimensional Embeddings", Stanford University, University of Washington, 10 pgs, obtained Mar. 20, 2015.

Macklin et al., "Position Based Fluids", to appear in ACM TOG 32(4), 2013, 5 pgs.

Mcadams et al., "Efficient Elasticity for Character Skinning with Contact and Collisions", 2011, 11 pgs.

McDonnell, Rachel, et al. "Clone attack! perception of crowd variety." ACM Transactions on Graphics (TOG). vol. 27. No. 3. ACM, 2008.

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

Muller et al., "Real Time Dynamic Fracture with Columetric Approximate Convex Decompositions", ACM Transactions of Graphics, Jul. 2013, 11 pgs.

Muller et al., "Position Based Dymanics", VRIPHYS 2006, 2014. 10.21, Computer Graphics, Korea University, 23 pgs.

Musse, Soraia Raupp, and Daniel Thalmann. "Hierarchical model for real time simulation of virtual human crowds." IEEE Transactions on Visualization and Computer Graphics 7.2 (2001): 152-164.

Nguyen et al., "Adaptive Dynamics With Hybrid Response," 2012, 4 pages.

O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.

Orin et al., "Centroidal dynamics of a humanoid robot," Auton Robot, vol. 35, pp. 161-176, 2013, 18 pages.

Parker et al., "Real-Time Deformation and Fracture in a Game Environment", Eurographics/ACM SIGGRAPH Symposium on Computer Animation (2009), 12 pgs.

Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.

Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.

Ruiz, Sergio, et al. "Reducing memory requirements for diverse animated crowds." Proceedings of Motion on Games. ACM, 2013.

Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.

Seo et al., "Compression and Direct Manipulation of Complex Blendshape Models", Dec. 2011, in 10 pgs.

Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.

Stomakhin et al., "Energetically Consistent Invertible Elasticity", Eurographics/ACM SIGRAPH Symposium on Computer Animation (2012), 9 pgs.

Thalmann, Daniel, and Soraia Raupp Musse. "Crowd rendering." Crowd Simulation. Springer London, 2013. 195-227.

Thalmann, Daniel, and Soraia Raupp Musse. "Modeling of Populations." Crowd Simulation. Springer London, 2013. 31-80.

Treuille, A. et al., "Near-optimal Character Animation with Continuous Control", University of Washington, 2007, 7 pgs.

Ulicny, Branislav, and Daniel Thalmann. "Crowd simulation for interactive virtual environments and VR training systems." Computer Animation and Simulation 2001 (2001 ): 163-170.

Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.

Vigueras, Guillermo, et al. "A distributed visualization system for crowd simulations." Integrated Computer-Aided Engineering 18.4 (2011 ): 349-363.

Wu et al., "Goal-Directed Stepping with Momentum Control," Eurographics/ ACM SIGGRAPH Symposium on Computer Animation, 2010, 6 pages.

Blanz et al., "Reanimating Faces in Images and Video" Sep. 2003, vol. 22, No. 3, pp. 641-650, 10 pages.

\* cited by examiner

SYSTEM FOR STREAMING CONTENT WITHIN A GAME APPLICATION ENVIRONMENT

BACKGROUND

Video games are becoming increasingly more complex and realistic. In order to create more realistic environments, games are including additional graphical elements to flesh out the environments, such as weather effects (for example, rain or snow), day/night cycles, and other elements within a game environment. The more complex and more detailed the environments become, the more they can tax the processing capabilities of computing systems. Game applications are generally executed on computing systems with limited processing resources. In the case of game consoles, the game consoles have standardized hardware components that generally do not change over the life of the console, which further increases the need to improve performance of the game application. It can be difficult to balance the need to have realistic and dynamic environments, while at the same time maintaining performance of the game application.

SUMMARY OF EMBODIMENTS

The systems, methods, and devices of this disclosure each have several innovative aspects, no single one of which is solely responsible for the all of the desirable attributes disclosed herein.

One embodiment discloses a computer-implemented method for streaming media content within a game application: by a hardware processor configured with computer executable instructions, executing a game application comprising a game environment, the game environment comprising a plurality of environmental elements for display within the game environment; determining priority information of a plurality of content assets based at least in part on first gameplay information associated with a gameplay state of the game application, wherein each content asset comprises a plurality of sequential frames; decoding frames of a first content asset from the plurality of content assets based at least in part on the priority information, wherein frames of the first content asset are decoded sequentially to generate decoded frames; selecting the first content asset of the plurality content assets for use within the game environment based at least in part on second gameplay information associated with a gameplay state of the game application; designating an environmental element of the plurality of environmental elements to receive the decoded frames of the first content asset; and streaming the decoded frames of the first content asset during runtime of the game application within the game environment to the environmental element, wherein the decoded frames are provided sequentially to an environmental element.

Another embodiment discloses a computing system comprising a data store storage device configured to store computer readable instruction configured to execute a game application, and a plurality of content asset information for the game application, wherein each content asset comprises a plurality of sequential frames of media data; a processor configured to execute the game application, the game application configured to generate a game environment including a plurality of environmental elements for display within the game environment, the game application comprising: a content management module configured to: determine priority information of a plurality of content assets based at least in part on gameplay information associated with a gameplay state of the game application; select a first content asset of the plurality content assets for use within the game environment based at least in part on gameplay information of the game application; designate an environmental element of the plurality of environmental elements to receive the decoded frames of the first content asset; and a decoding module configured to decode frames of individual content assets based at least in part on the priority information, wherein frames of the first content asset are decoded sequentially to generate decoded frames; wherein the decoded frames of the first content asset are configured to stream from the first content asset to the environmental element during runtime of the game application, wherein the decoded frames are provided sequentially to the environmental element.

Another embodiment discloses a non-transitory computer readable medium comprising computer-executable instructions for streaming content within a game application that, when executed by a computer, causes the computer to: executing a game application comprising a game environment, the game environment comprising a plurality of environmental elements for display within the game environment; determining priority information of a plurality of content assets based at least in part on first gameplay information associated with a gameplay state of the game application, wherein each content asset comprises a plurality of sequential frames; decoding frames of a first content asset from the plurality of content assets based at least in part on the priority information, wherein frames of the first content asset are decoded sequentially to generate decoded frames; selecting the first content asset of the plurality content assets for use within the game environment based at least in part on second gameplay information associated with a gameplay state of the game application; designating an environmental element of the plurality of environmental elements to receive the decoded frames of the first content asset; and streaming the decoded frames of the first content asset during runtime of the game application within the game environment to the environmental element, wherein the decoded frames are provided sequentially to an environmental element.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Figure 1:
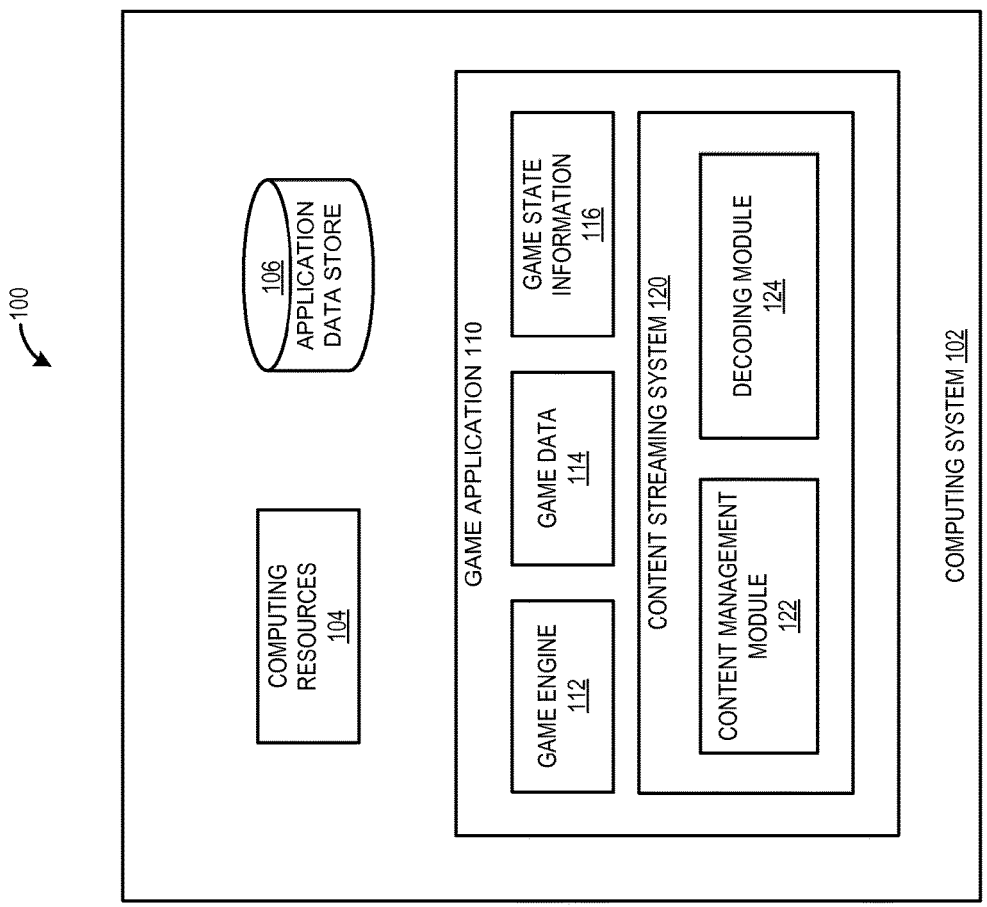
FIG. 1 illustrates an embodiment of a computing system that can implement one or more embodiments of a content streaming system.

One of the problems encountered in video games is balancing performance and graphics quality. As graphics quality increases, performance demands increase as well. As the games become more complex and more detailed, the processing requirements for the systems increase. Computing systems, such as game consoles, have limited computing resources, and it can be difficult to balance graphics quality with game performance. For example, a video game may include thousands of elements within the game environment that are being rendered during runtime. The central processing unit (CPU) and graphics processing units (GPU) are constantly processing user inputs in order to render each of the elements within the game environment for every frame. Generally, for smooth animation, a game application attempts to maintain frame rates of at least 30 frames per second during runtime.

At least a portion of the game environment can include environmental elements within the game environment, such as, for example, the ambient lighting elements (such as the sun, moon, street lights, and the like), weather effects, lights within a building, television screens, billboard displays, and other aspects or elements within the game environment that are used to create a realistic and living environment for the user. Many of these objects are passive objects that a character will observe without any direct interactions. In order to create a quality game experience, a game application can prioritize rendering elements of the game environment based on the importance of the elements to the gameplay experience of the user. For example, a game application may only render elements within a field of view of the user up to a determined draw distance. Additionally, a game application may limit the number of elements rendered in each frame of the game environment. Additionally, real-time rendering of video content within a game can be incredibly taxing on computing resources. For example, rendering multiple high definition videos during runtime of a game application can be very difficult to process.

One solution to the aspects of these problems is to provide a content streaming system that can stream pre-rendered content within the game environment. Generally, streaming pre-rendered content requires much less computing resources than rendering content during runtime. The content streaming system can be used to stream pre-rendered content in place of rendering content during runtime, which can help improve the usage of computing resources during runtime of a game application. The content streaming system can use sequential content, such as videos, as textures for environmental elements within the game application. For example, in place of a static texture, the content streaming system can stream a video file as the texture for environmental objects within a game. The content can be any type of content that can be sequentially divided up into frames. The content can be referred to as a content asset.

For example, a game environment may include a billboard element that comprises a mesh and a texture. The mesh defines the shape of the object and the texture define the appearance, such as the color. In the embodiment, the content streaming system provides a system for streaming a content asset as a texture on the mesh. The content asset can be used in place of or in addition to the existing texture in order to create a texture that is streamed to the environmental element within the game environment, thereby creating an element that can appear to be dynamically rendered. The stream can be managed and controlled by an embodiment of a content management module.

In one embodiment, the content streaming system can include a decoding module that can decode the content assets during runtime. The content streaming system can stream the content asset to the environmental elements during runtime without dynamically rendering the content. A content management module can prioritize the order in which the content asset content is decoded and manage the process of streaming the content asset to the environmental elements during runtime. In some embodiments, the content streaming system can decode multiple resolutions of the same content, where each content asset is a different resolution. A set of content assets of the same content but different resolutions can be a referred to as a content feed. The content management module can dynamically select a content asset of the appropriate resolution for streaming to the environmental element based on gameplay information. The use of pre-rendered content assets can replace at least some of the rendering of dynamic elements? and content during runtime and can help improve usage of the computing resources by the game application.

Overview of Video Game Environment

FIG. 1 illustrates an embodiment of a computing system 100 for implementing a content streaming system 120 on a user computing system 102. The user computing system 102 includes computing resources 104, an application data store 106, and a game application 110. The user computing system 102 may have varied local computing resources 104 such as central processing units and architectures, memory, mass storage, graphics processing units, communication network availability and bandwidth, and so forth. Further, the user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, personal digital assistants, tablets, or the like), to name a few. A more detailed description of an embodiment of user computing system 102 is described below with respect to FIG. 8.

Game Application

In one embodiment, the user computing system 102 can execute a game application 110 based on software code stored at least in part in the application data store 106. The game application 110 may also be referred to as a videogame, a game, game code, and/or a game program. A game application 110 should be understood to include software code that a user computing system 102 can use to provide a game for a user to play. A game application 110 may comprise software code that informs a user computing system 102 of processor instructions to execute, but may also include data used in the playing of the game, such as data relating to constants, images and other data structures. For example, in the illustrated embodiment, the game application 110 includes a game engine 112, game data 114, game state information 116, and a content streaming system 120.

In some embodiments, the user computing system 102 is capable of executing a game application 110, which may be stored and/or executed in a distributed environment. For example, the user computing system 102 may execute a portion of a game and a network-based computing system (not shown), may execute another portion of the game. For instance, the game may be a massively multiplayer online role-playing game (MMORPG) that includes a client portion executed by the user computing system 102 and a server portion executed by one or more application host systems.

Game Engine

In one embodiment, the game engine 112 is configured to execute aspects of the operation of the game application 110 within the computing device 100. Execution of aspects of gameplay within a game application can be based, at least in part, on the user input received, the game data 114, and/or the game state information 116. The game data 114 can include game rules, prerecorded motion capture poses/paths, environmental settings, constraints, skeleton models, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 112 can receive the user inputs and determine in-game events, such as actions, collisions, runs, throws, attacks and other events appropriate for the game application 110. During runtime operation, the game engine 112 can read in game data 114 and game state information 116 to determine the appropriate in-game events.

In one example, after the game engine 112 determines the in-game events, the in-game events can be conveyed to a movement engine that can determine the appropriate motions the characters should make in response to the events and passes those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. For example, the skinning and rendering engine can combine content streams received from the content streaming system with objects and meshes within the game environment as will be described in further detail below. The full scene can be conveyed to a renderer, which generates a new frame for display to the user. The process can repeated for rendering each frame during execution of the game application. Though the process has been described in the context of an in-game event for a character motion, the process can be applied to any process for processing events and rendering the output for display to a user.

Game Data

The game data 114 can include game rules, prerecorded motion capture poses/paths, environmental settings, environmental objects, constraints, skeleton models, and/or other game application information. At least a portion of the game data 114 can be stored in the application data store 106. In some embodiments, a portion of the game data 114 may be received and/or stored remotely, in such embodiments, game data may be received during runtime of the game application.

Game State Information

During runtime, the game application 110 can store game state information 116, which can include a game state, character states, environment states, scene object storage, and/or other information associated with a runtime state of the game application 110. For example, the game state information 116 can identify the state of the game application 110 at a specific point in time, such as a character position, character action, game level attributes, and other information contributing to a state of the game application. The game state information can include dynamic state information that continually changes, such as character movement positions, and static state information, such as the identification of a game level within the game.

Content Streaming System

In one embodiment, the content streaming system 120 can decode and stream content assets within a game environment. The content streaming system 120 can be an in-game system that is used to stream content assets within a game environment during runtime operation of the game application 110. The content streaming system 120 can include a content management module 122 and a decoding module 124. The application data store 106 can store the content assets 200 that are accessed by the content streaming system 120 for use within the game environment. The operation of the content streaming system 120 can be further described with additional reference to FIG. 2, which illustrates an embodiment of a content streaming system 120.

A content asset 200, as used herein, can refer to a defined portion of sequentially ordered content, such as a video file. The content asset 200 can have a determined length, including a start point and an end point. The content asset 200 may be divided into frames and ordered sequentially. The content assets 200 may also be referred to as linear content assets or sequential content assets. The content assets 200 can also be referred to as pre-rendered or pre-baked assets, in which the content has been rendered at a determined resolution and stored within a file. Examples of content assets can include a rendered cut scene, in-game newsfeeds, animated billboards, weather effects, animated light maps, and other rendered content. Each frame of the content assets can be decoded and streamed sequentially for display within the game environment.

Figure 2:
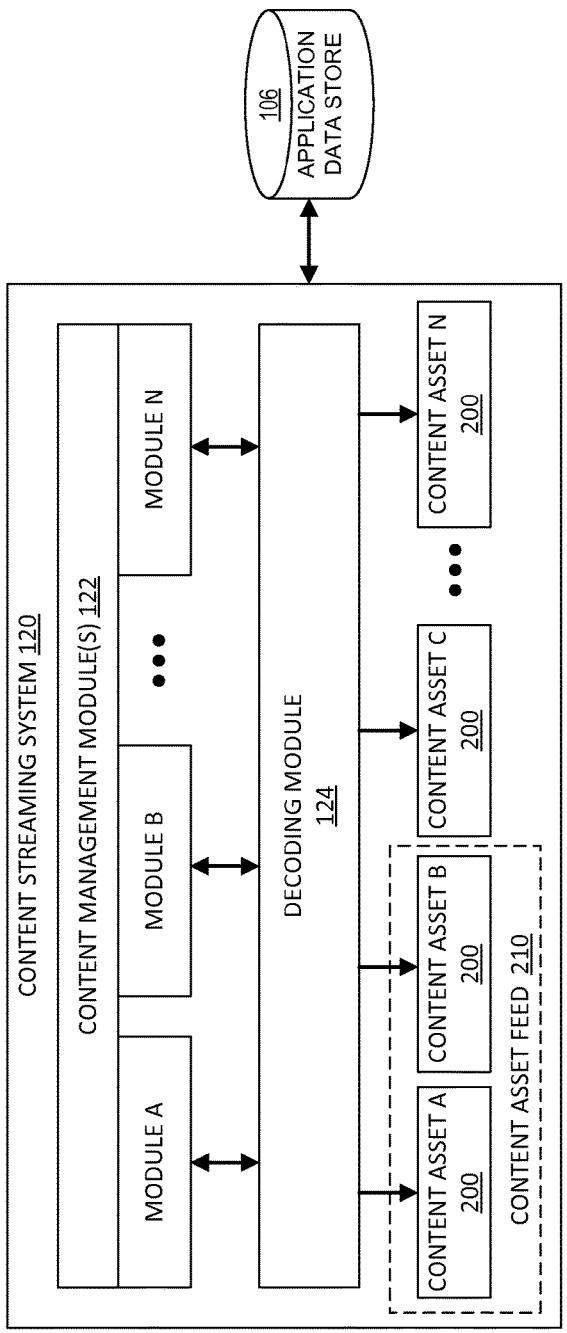
FIG. 2 illustrates as embodiment of a content streaming system.
Figure 4:
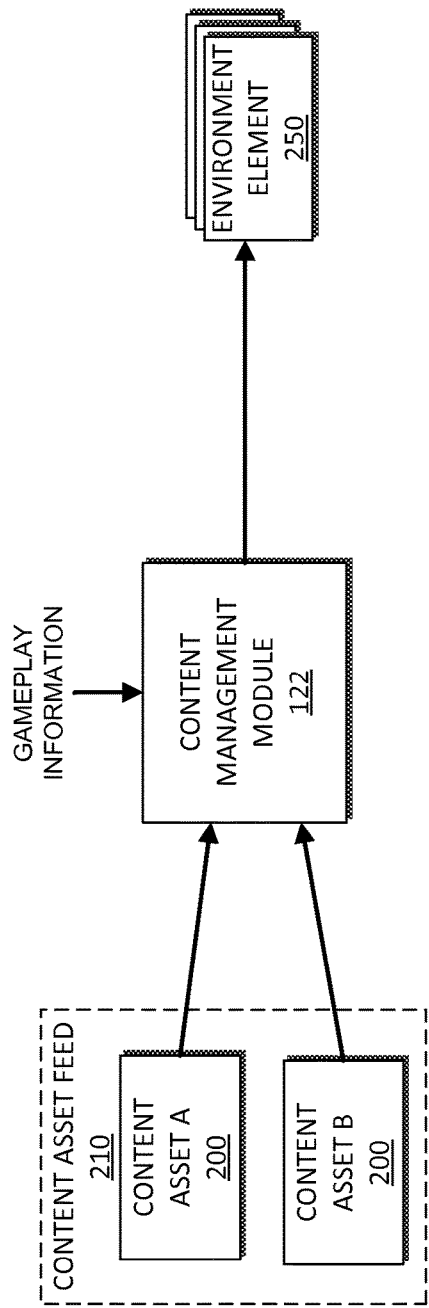
FIG. 4 illustrates one embodiment of a block diagram illustrating operation of a content streaming system 120.

The content streaming system 120 can include one or more content management modules 122. In one embodiment, the content management modules 122 manages the decoding and streaming of content assets 200 by the content streaming system 120. FIG. 2 provides additional detail regarding an embodiment of decoding of content assets 200 and FIG. 4 provides additional detail regarding one embodiment of streaming of content assets 200 within the game environment. The content streaming system 120 can include any number of modules that can be configured to manage content within the game application. Each content management module 122 can be responsible for managing a defined type or portion of content assets for use within the game environment. A content management module 122 may manage thousands of content assets. For example, a content management module 122 may manage content assets associated with billboards, screens, televisions, and other content assets that can display video sequences within the game environment. These various modules can act as plug-ins for the content streaming system 120 based on the specific operation of the game application 110.

As illustrated in the embodiment of FIG. 2 the content management modules can be in communication with the decoding module 124. The content management module 122 can provide priority information associated with content assets to the decoding module 124. The content management module 122 can determine priority information associated with content assets 200 based on gameplay information associated with a runtime state of the game environment. The content management module 122 can enable and disable decoding of content assets by the decoding module 124.

In some embodiments, content management module 122 can receive gameplay information from the game application, such as game state information 116. The gameplay information may include information such as location of the character within the game environment, the facing direction of the character within the game environment, in-game lighting, and other factors that can determine the portion of the game environment that is displayed to the user. The content management module 122 can receive updated gameplay information on a continuous basis, such as, for example, multiple times per second. The gameplay information can be used to determine priority information associated with content assets 200.

For example, a content management module 122 may be responsible for displaying video on various environmental elements within the game environment, such as electronic billboards, television screens, and the like. At any time, the in-game character may be located in a position where content assets associated with the content management module 122 need to be displayed. During runtime, the content management module 122 determines priority information associated with the content assets based at least in part on the current gameplay information. The content management module 122 can provide priority information to the decoding module 124 periodically, aperiodically, and/or event-based updates, such as when priority information changes. The content management module 122 can monitor the decoding of the content assets by the decoding module 124.

The priority information can be used by the decoding module 124 to determine the order and amount of content that needs to be decoded by the decoding module 124. In one embodiment, the priority information can be time-based priority information. For example, the time-based priority information can be implemented as a time value, such as a nanosecond, millisecond, or other time value. The time value can represent an amount of decoding associated with a content asset that needs to be completed above a base value. For example, if the base value is zero and the time value of a content asset is 100 milliseconds, the minimum amount of decoded content for the content asset would need to be 100 milliseconds. In such an instance, if the content was rendered at 30 frames per second, the decoding module 124 would need to decode three frames of content. In some embodiments, the priority information can represent a minimum buffering time associated with the content asset 200. In some embodiments, the priority information may be category-based priority information. Category-based priority information can identify a category level associated with a content asset, such as urgent, high, medium, and low. Each content asset 200 can be assigned a priority levels. Each priority level can have a threshold that can identify the minimum number of frames required to be decoded.

The decoding module 124 can decode the content assets 200 based on the priority information received from the content management module(s) 122. The decoding module 124 can use the priority information to determine the order and amount of decoding for each of the content assets 200. The decoding module 124 communicates with the application data store 106 to retrieve the content assets 200 that need to be decoded within the game application. Decoding the content asset, can also be referred to as buffering the content asset data for streaming within the game environment. Higher priority assets can have larger amounts of content decoded, thereby providing a larger buffer for streaming. In some embodiments, the priority information can be a minimum threshold or minimum buffer that the content asset requires prior to being streamed within the game environment. In some embodiments, the decoding module 124 can treat all priority information the same regardless of the content management module 122 that provided the information. In embodiments where two or more of the content management modules 122 use the same type of priority information, the decoding module 124 can decode the content assets in accordance with the priority information without conflicts.

In some embodiments, the decoding module 124 can be configured to operate during allocated processing time periods. Generally, the allocated time periods can occur during idle times of the game application 110. The game application 110, or a component of the game application, such as the game engine 112, can allocate processing time to the decoding module 124 for decoding of assets. During the allocated processing time, the decoding module 124 can continue decode content assets even after the thresholds associated with the priority information have been satisfied. The decoding module 124 can continue to decode each frame above the threshold and in accordance with the existing priority information. In an illustrative example, a first content asset has a 100 millisecond priority value over a second content asset. In such a case, the first content asset will maintain a 100 millisecond buffer above the second content asset. For example if the buffer of the second content asset reaches 800 milliseconds, the first content asset would have a 900 millisecond buffer. In some embodiments, the decoding module 124 can decode multiple content assets 200 in parallel. For example, multiple content assets can be decoded simultaneously. At the end of the allocated processing time, the decoding module 124 waits until the next allocation to resume decoding.

In some embodiments, the operation of decoding module 124 is decoupled from the operation of the content management module 122. For example the content management modules 122 can continue to update priority information continuously or nearly continuously during operation of the game application. For example, content management module 122 may update priority multiple times before the decoding module 124 is operating. The decoding module 124 can be configured to maintain the most recent prioritization information for each content asset 200.

In some embodiments, the content management module 122 can enable or disable content assets 200 in addition to providing priority information. In some embodiments, the priority information can effectively disable content assets. For example, the decoding module 124 may not decode an asset if the priority value associated with the content asset 200 is too low.

The decoding module 124 can provide the status of the assets that are being decoded to the content management module 122. For example, the decoding module 124 can provide the number of frames decoded for each of the content assets. The content management modules 122 can use the resolution information of the various assets 202 to implement or otherwise render the assets within the game environment.

Content Asset Feed

Figure 3:
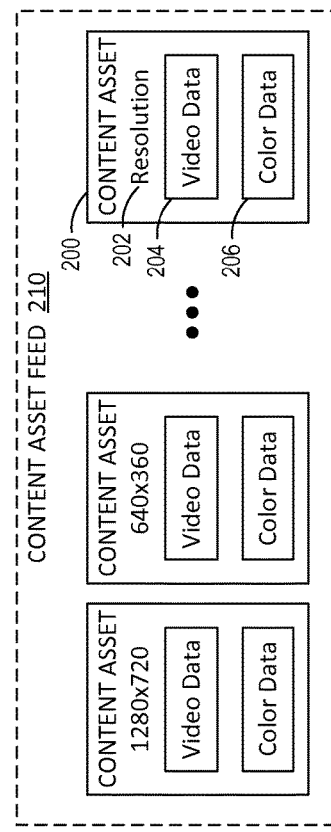
FIG. 3 illustrates embodiments of assets of a content feed.

With additional reference to FIG. 3, an embodiment of a content asset feed is illustrated. The content management modules can group content a plurality of assets 200 into a single content asset feed 210. A content asset feed 210 can include a plurality of assets that contain variations of the same content. For example, a video file can be rendered at multiple different resolutions. Each content asset within the feed 210 can be rendered from the same video information at different resolutions. As illustrated in FIG. 3, the asset 200 includes resolution information 202, video data 204, and color data 206. The content asset displayed in FIG. 3 and in other embodiments, more or less information may be included within a content asset. In the illustrated example, the resolution of the first asset is 1280×720 and the second resolution is 640×480. The video feed 210 may include any number of assets associated with a specific set of content. Each asset feed can have any number of individual assets associated with the same content, as defined by the requirements of the specific game application. Each asset 200 is a distinct object that can be decoded by the decoding module 124 independent of other content assets within the feed 210. For example, the decoding module 124 may decode a subset of the total content assets 200 within a defined asset feed 210. In some embodiments, the assets do not include identification information associated with other assets within an asset feed 210. The content management modules 122 can be configured to manage each of the assets within a defined asset feed 210. The decoding module 124 may not know or determine whether assets 200 are associated with a specific asset feed 210.

Runtime Operation

FIG. 4 illustrates one embodiment of a runtime operation of the content streaming system 120 for streaming content to environmental elements 250 within the game environment. The term environmental element can be used to refer to elements such as meshes, structures, or other elements within the game environment. The environmental elements may also be referred to as clients.

During runtime, the content management module 122 receives gameplay information associated with the game application 110. The gameplay information may include information such as location of the character within the game environment, the facing direction of the character within the game environment, movement information of the character, in-game lighting, and other factors that can determine the portion of the game environment that is displayed to the user. The portion of the game environment displayed to the user may include one or more environmental elements 250 associated with a content asset 200. Based at least in part on the gameplay information, the content management module 122 can determine a preferred or approximate size of the content asset 200 to stream to the environmental element 250.

As previously discussed with respect to FIG. 2, in some embodiments, the content management module 122 prioritizes the appropriate content assets 200 for decoding by the decoding module 124. The content management module 122 can monitor the decoded content assets 200 to determine the amount of content of a content asset that has been decoded (for example, the number of frames) by the decoding system 124. The content management module 122 can determine whether the content asset 200 has sufficient decoded information in order to stream the content asset to the environmental element 250. In some embodiments, the content management module 122 can use a decoding thresholds to determine can determine the appropriate number of frames prior to enabling a content stream from a content asset 200 to an environmental element 250. In some embodiments, the content management module 122 may buffer multiple content assets having different resolutions and prioritize the lower resolution asset over the higher resolution asset in order to help guarantee that a content asset is ready to be displayed within the game environment when needed.

Based at least in part on the gameplay information and the content asset decoding information, the content management module 122 can identify a content asset 200 to stream to the environmental element 250. In some instances, a content asset 200 having the preferred resolution does not satisfy the decoding threshold. In such a case, the content streaming system 120 can generally stream the same content asset that has a lower resolution.

After the content asset has been identified, the content management module 122 streams the content from the content asset content streaming system 120 to the environmental element 250. The content management module 122 can establish communication between the environmental element and the content asset stream. In some embodiments, the content management module 122 identifies the emitting channel of the content asset 200 and the receiving channel of the environmental element 250. The content asset 200 can be integrated into the environmental element by a rendering engine of the game application 110.

During display of the content asset 200 within the game environment, the content management module 122 can continue to monitor the gameplay information and content asset decoding information. The content management module 122 can determine when to swap the existing content asset 200 for a different content asset or a content asset that has a different resolution. For example as a character moves, the content management module 122 can dynamically adjust the priority of the content assets 200 to select a content asset 200 with increased or decreased resolution. Additionally, if a content asset 200 of a better resolution is available, the content management module 122 can dynamically swap the content asset of the environmental element. In one embodiment, the content management module 122 changes the channel information in order to change assets. The content management module 122 can continually identify the appropriate asset based on the gameplay information and decoding information. As part of this process, the content management module 122 may continue to update priority information so that decoding module 124 will continually decode appropriate assets within the game environment.

Content Asset Stream

Figure 5:
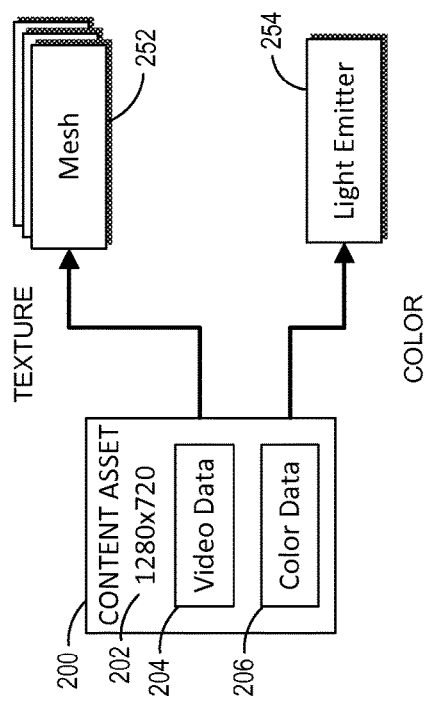
FIG. 5 illustrates one embodiment of a block diagram illustrating an embodiment of streaming video content in a video game application.

FIG. 5 illustrates an embodiment of a content asset stream that is being provided to an environmental element 250 by the content management module 122. In this embodiment, the environmental element comprises a mesh 252 and a light emitter 254. The content asset 200 comprises a resolution 202, video data 204, and color data 206. The video data 204 can comprise the visual data displayed within each frame content asset. The color data 206 can be an average color of the video data at each frame. The content asset can be applied as a texture onto the mesh 252 of the environmental element 250. The light emitter of the environmental element can be configured to emit color data 206 provided by the content asset 200 at each frame.

Example Embodiment of Game Application Interface

Figure 6A:
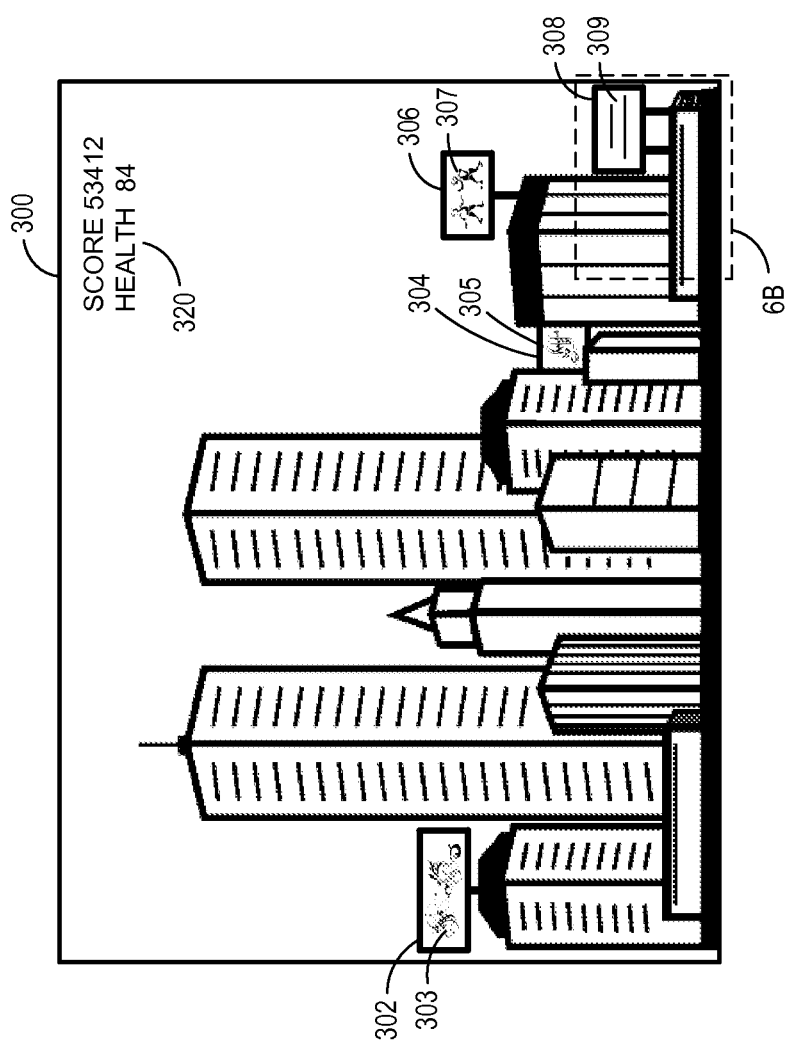
FIGS. 6A and 6B illustrate embodiments of a game application interface.
Figure 6B:
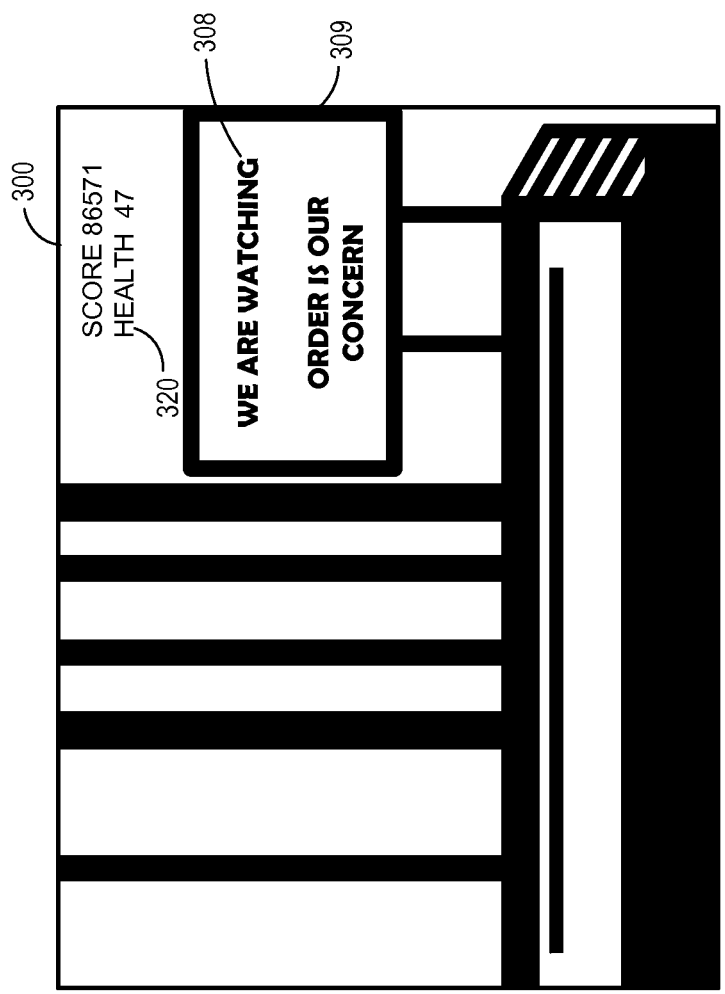

FIGS. 6A and 6B provide an illustrative embodiment of a runtime example of the content streaming system 120 within a game application interface 300. The interface comprises game interface elements 320, such as score and health. FIG. 6A includes a plurality of environmental elements 302, 304, 306, and 308 that are managed by a content management module 122. Each of the elements 302, 304, 306, and 308 are associated with content assets 303, 305, 307, and 309, respectively. In some embodiments, an environmental element may have more than one associated content asset feed. Additionally other content management modules can control other elements within the game environment.

In this embodiment, the environmental elements are can be billboards or screens that are configured to display a video segment of the associated content asset. As illustrated, due to the position of the player character, each of the elements only uses a small portion of the screen. It would be a significant waste of computing resources to display each of the content assets in a high definition resolution such as 720p or 360p. The content management module 122 can determine the appropriate resolution of the content assets to display within interface 300 based on the gameplay information. Additionally, the content management module 122 can continually prioritize the content assets for decoding. The content management module 122 can continually update the selected content asset and the priority information during runtime. For example, the dashed box illustrates another frame of reference for the character within the game environment, as displayed within FIG. 6B.

As illustrated in FIG. 6B, only element 308 is displayed within the user interface 300. Additionally, the element 308 has increased substantially in size relative to the user interface 300. As the size increases the resolution of the content asset 309 also can increase to account for the change in size within the game environment are viewed by the character. The content management module 122 can update the stream associated with the element 309 to a content asset having the appropriate resolution for the position of the character. For example, as illustrated, additional details are available due to the increased resolution of the content asset 309 compared to the size relative size of the element illustrated in FIG. 6A. Additionally the other content assets 303, 305, and 307 can have the priority of the content asset reduced and/or disabled in order to account for the change in position of the character within the game environment.

Content Streaming Process

Figure 7:
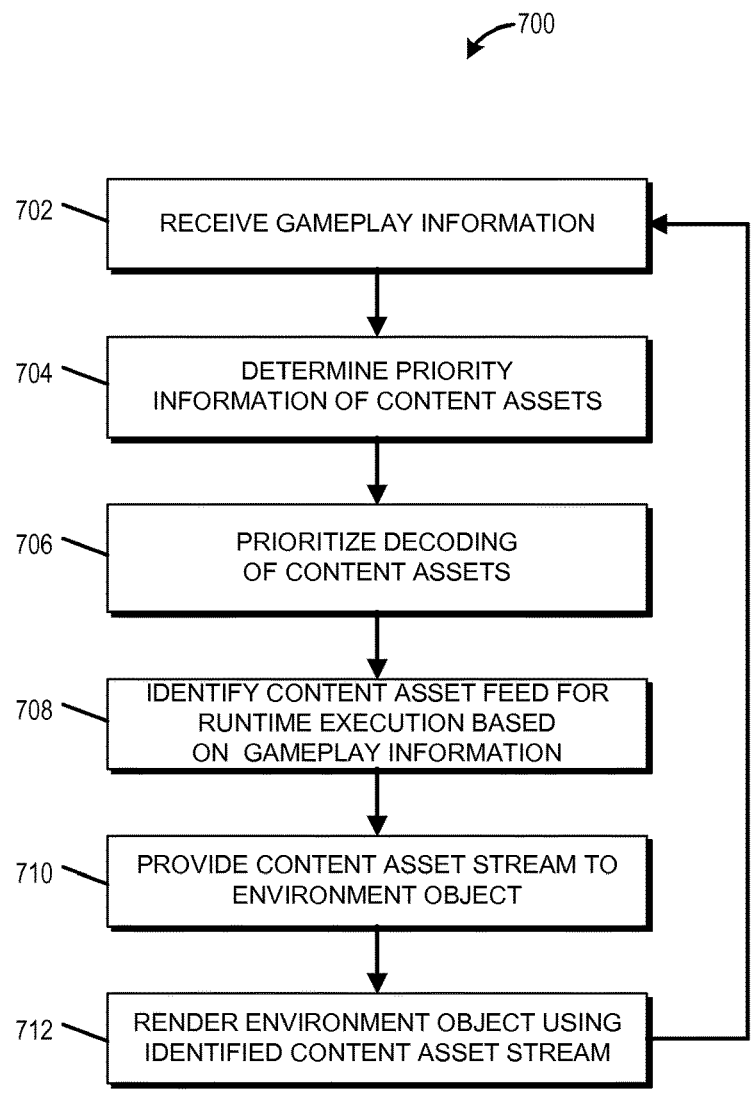
FIG. 7 illustrates a flowchart of an embodiment of a content streaming process.

FIG. 7 illustrates an embodiment of a flowchart for a process for execution of content streaming within a game application. The process 700 can be implemented by any system that can decode and stream content within a game environment during runtime of a game application. For example, the process 700, in whole or in part, can be implemented by a game application 110, a game engine 114, a content streaming system 120, a content management module 122, a decoding module 124, or other application module. Although any number of systems, in whole or in part, can implement the process 700, to simplify discussion, the process 700 will be described with respect to particular systems. Further, although embodiments of the process 700 may be performed with respect to variations of systems comprising various game application environments, to simplify discussion, the process 700 will be described with respect to the computing system 102.

At block 702, gameplay information is received by the content streaming system 120. The gameplay information may include information such as location of the character within the game environment, the facing direction of the character within the game environment, movement information of the character, in-game lighting, and other factors that can determine the portion of the game environment that is displayed to the user. The content management module 122 can receive updated gameplay information multiple times per second. In some embodiments, the gameplay information can be provided to a content management module 122 by a game engine.

At block 704, the content streaming system 120 determines priority information associated with content assets based on the gameplay information. The content streaming system 120 can identify content assets based on the gameplay information for prioritized decoding. The content streaming system 120 can determine content assets the system anticipates needing in the future. For example, the content streaming system 120 may determine based on the movement trajectory of the character within the game environment that a content asset will need to be displayed. Additionally, the content streaming system 120 can adjust the priority of existing content assets. For example, the priority of a content asset within a content feed may be reduced or increased. In some embodiments, the content management module 122 can determine the priority information based on the gameplay information.

At block 706, the content streaming system 120 decodes the assets based on the priority information. The decoding module 124 can decode the content assets 200 based on the priority information received from the content management module(s) 122. The decoding module 124 can use the priority information to determine the order and amount of decoding for each of the content assets 200. The decoding module 124 communicates with the application data store 106 to retrieve the content assets 200 that need to be decoded within the game application. Decoding the content asset buffers the content asset data for streaming within the game environment. Higher priority assets can have larger amounts of content decoded, thereby providing a larger buffer for streaming. In some embodiments, the priority information can be a minimum threshold or minimum buffer that the content asset requires prior to being streamed within the game environment.

At block 708, the content streaming system 120 determines an asset that is available for runtime operation based on the gameplay information in the game environment. The content management module 122 can determine the approximate size of the content asset 200 to stream to the environmental element 250 and can determine whether the content asset 200 has sufficient decoded information in order to stream the content asset to the environmental element 250. Based at least in part on the gameplay information and the content asset decoding information, the content management module 122 can identify a content asset 200 to stream to the environmental element 250. In some embodiments, a content asset 200 having the preferred resolution does not satisfy the decoding threshold. In such a case, the content streaming system 120 can select a content asset having a lower resolution.

At block 710, the content streaming system 120 provides the identified asset to an environmental element within the game environment. The content management module 122 can stream the content from the content asset content streaming system 120 to the environmental element. The content management module 122 can establish communication between the environmental element and the content asset stream by adjusting configuration parameters of the environmental element and/or the content asset stream. In some embodiments, the content management module 122 identifies the emitting channel of the content asset 200 and the receiving channel of the client 250 in order to establish the stream.

At block 712, the asset is associated with the client and rendered for display within the game environment. The content asset 200 can be integrated into the client by a rendering engine of the game application 110. During streaming of the content asset 200 within the game environment, the content management module 122 can continue to monitor the gameplay information and content asset decoding information. The content management module 122 can determine when to swap the existing content asset 200 for a content asset that has a different resolution. The process can continue throughout runtime operation of the game application.

Overview of Computing Device

Figure 8:
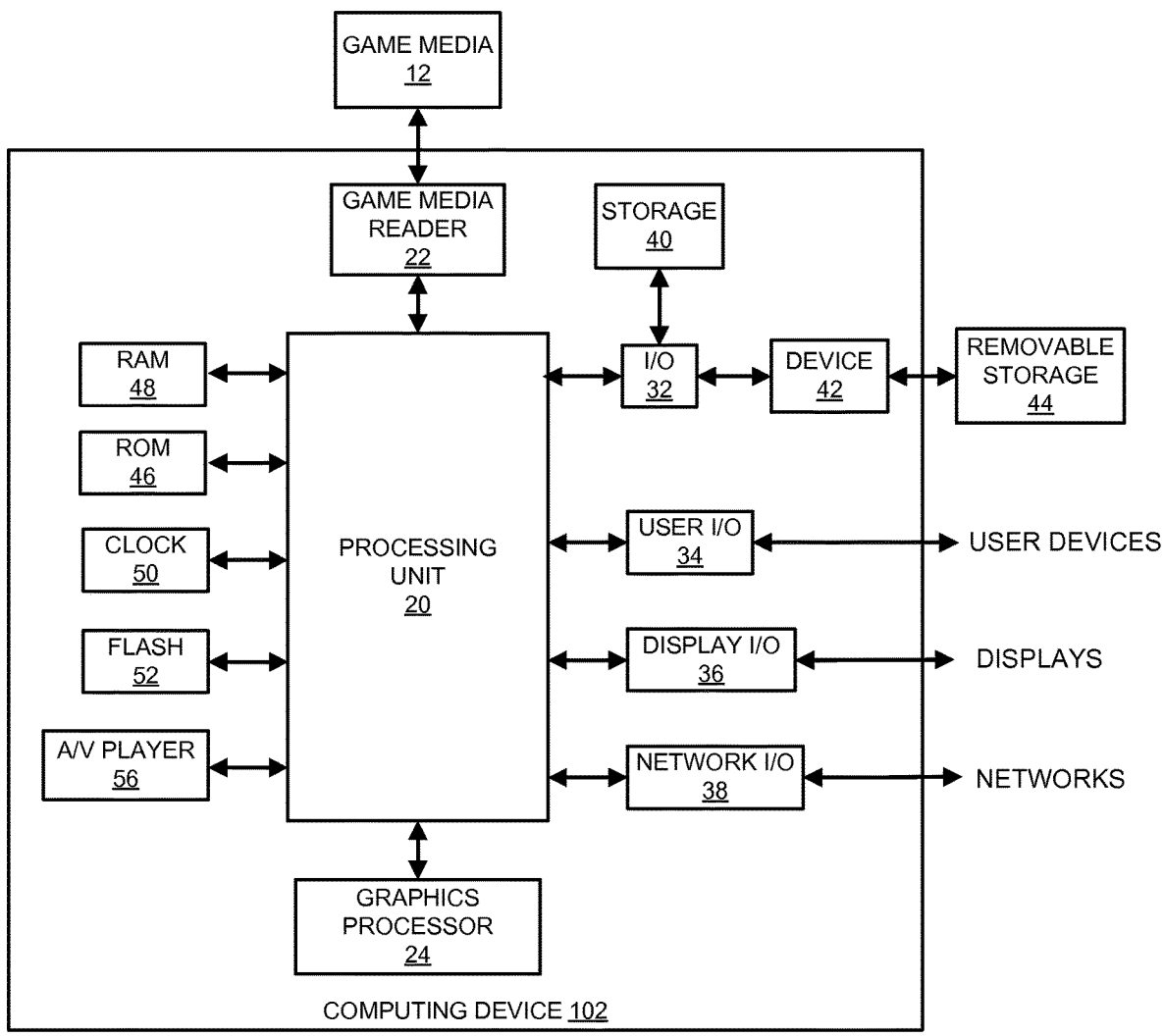
FIG. 8 illustrates an embodiment of a computing device.

FIG. 8 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for streaming media content within a game application, comprising:

by a hardware processor configured with computer executable instructions, executing a game application comprising a game environment, the game environment comprising a plurality of environmental elements for display within the game environment, wherein each of the environmental elements comprise a mesh defining a shape of the environmental element;

determining priority information of a plurality of content assets of a content asset feed based at least in part on first gameplay information associated with a gameplay state of the game application, wherein the priority information identifies a decoding order of the plurality of content assets, an amount of content of each content asset that is to be decoded, and a priority level associated with each content asset, wherein the amount of content of each content asset identified by the priority information is a number of frames and each priority level identifies a minimum number of frames to be decoded for each content asset associated with the priority level, wherein each content asset of the content asset feed comprises video data that includes a plurality of sequential frames, wherein the video data of each content asset of the content asset feed comprises the same video content pre-rendered at a different resolution;

decoding frames of the plurality of content assets based at least in part on the priority information, wherein the frames of individual content assets are decoded sequentially to generate decoded frames;

selecting a first content asset of the plurality of content assets having a specific resolution for use within the game environment based at least in part on second gameplay information associated with a gameplay state of the game application;

designating a first mesh of a first environmental element of the plurality of environmental elements to receive the decoded frames of the first content asset as a texture, wherein the texture defines an appearance of the first environmental element within the game environment;

providing at least a first decoded frame of the first content asset during runtime of the game application within the game environment as the texture of the first mesh of the first environmental element, wherein decoded frames of the first content asset are provided sequentially to the first environmental element; and rendering a game output frame for display to a user during runtime of the game application, the game output frame comprising at least a portion of the first decoded frame as the texture of the first mesh of the first environmental element.

2. The computer-implemented method of claim 1, wherein designating the first environmental element of the plurality of environmental elements to receive the first content asset comprises designating a receiving channel of the first environmental element to receive the decoded frames from an emitting channel of the first content asset.

3. The computer-implemented method of claim 1 further comprising allocating decoding processing resources prior to the decoding frames of individual content assets.

4. The computer-implemented method of claim 1, wherein the first content asset comprises an average light value associated with each decoded frame.

5. The computer-implemented method of claim 1 further comprising designating a plurality environmental elements to receive the decoded frames of the first content asset.

6. The computer-implemented method of claim 1 further comprising designating a second content asset to replace the first content asset based at least in part on updated gameplay information.

7. The computer-implemented method of claim 6, wherein the second content asset comprises different video content.

8. The computer-implemented method of claim 1 further comprising updating the priority information based at least in part on updated gameplay information.

9. The computer-implemented method of claim 1, wherein the amount of content of each content asset identified by the priority information is a time value representative of a minimum amount of time of the content asset to be decoded, wherein the time value comprises a base time value and a priority time value, wherein the priority time value is indicative of an amount of decoding specific to each content asset that is above the base time value.

10. A computing system comprising:

a data store storage device configured to store computer readable instruction configured to execute a game application, and a plurality of content assets of a content asset feed for the game application, wherein each content asset comprises a plurality of sequential frames of media data, wherein the media data of each content asset of the content asset feed comprises the same media content pre-rendered at a defined resolution;

a processor configured to execute the game application, the game application configured to generate a game environment including a plurality of environmental elements for display within the game environment, the game application configured to:

determine priority information of the plurality of content assets of a content asset feed based at least in part on gameplay information associated with a gameplay state of the game application, wherein the priority information identifies a decoding order of the plurality of content assets, an amount of content of each content asset that is to be decoded, and a priority level associated with each content asset, wherein the amount of content of each content asset identified by the priority information is a number of frames and each priority level identifies a minimum number of frames to be decoded for each content asset associated with the priority level;

decode frames of the plurality of content assets based at least in part on the priority information, wherein the frames of individual content assets are decoded sequentially to generate decoded frames;

select a first content asset of the plurality of content assets having a specific resolution for use within the game environment based at least in part on gameplay information of the game application;

designate a first mesh of a first environmental element of the plurality of environmental elements to receive decoded frames of the first content asset as a texture, wherein the texture defines an appearance of the first environmental element within the game environment; and provide at least a first decoded frame of the first content asset as the texture of the first mesh of the first environmental element during runtime of the game application, wherein decoded frames of the first content asset are provided sequentially to the first environmental element; and render a game output frame for display to a user during runtime of the game application, the game output frame comprising at least a portion of the first decoded frame as the texture of the first mesh of the first environmental element.

11. The system of claim 10, wherein the processor is further configured to designate a second content asset based at least in part on updated gameplay information.

12. The system of claim 11, wherein the second content asset comprises different video content from the first content asset.

13. The system of claim 10, wherein the gameplay information comprises at least one of a location of a virtual character within the game environment, and a facing direction of the virtual character within the game environment, and a size of the first environmental element within a user interface.

14. A non-transitory computer readable medium comprising computer-executable instructions for streaming content within a game application that, when executed by a computer, causes the computer to perform operations comprising:

executing a game application comprising a game environment, the game environment comprising a plurality of environmental elements for display within the game environment, wherein each of the environmental elements comprise a mesh defining a shape of the environmental element;

determining priority information of a plurality of content assets of a content asset feed based at least in part on first gameplay information associated with a gameplay state of the game application, wherein the priority information identifies a decoding order of the plurality of content assets, an amount of content of each content asset that is to be decoded, and a priority level associated with each content asset, wherein the amount of content of each content asset identified by the priority information is a number of frames and each priority level identifies a minimum number of frames to be decoded for each content asset associated with the priority level, wherein each content asset of the content asset feed comprises video data that includes a plurality of sequential frames, wherein the video data of each content asset of the content asset feed comprises the same video content pre-rendered at a different resolution;

decoding frames of the plurality of content assets based at least in part on the priority information, wherein the frames of individual content assets are decoded sequentially to generate decoded frames;

selecting a first content asset of the plurality of content assets having a specific resolution for use within the game environment based at least in part on second gameplay information associated with a gameplay state of the game application;

designating a first mesh of a first environmental element of the plurality of environmental elements to receive the decoded frames of the first content asset as a texture, wherein the texture defines an appearance of the first environmental element within the game environment;

providing at least a first decoded frame of the first content asset during runtime of the game application within the game environment as the texture of the first mesh of the first environmental element, wherein decoded frames of the first content asset are provided sequentially to the first environmental element; and rendering a game output frame for display to a user during runtime of the game application, the game output frame comprising at least a portion of the first decoded frame as the texture of the first mesh of the first environmental element.

15. The non-transitory computer readable medium of claim 14, wherein designating the first environmental element of the plurality of environmental elements to receive the first content asset comprises designating a receiving channel of the first environmental element to receive the decoded frames from an emitting channel of the first content asset.

16. The non-transitory computer readable medium of claim 14 further comprising designating a second content asset based at least in part on updated gameplay information.

* * * * *